United States Patent [19]
Jankowitz et al.

[11] Patent Number: 6,064,972
[45] Date of Patent: May 16, 2000

[54] RISK MANAGEMENT TECHNIQUE FOR NETWORK ACCESS

[75] Inventors: Charles M. Jankowitz, Old Bridge; Richard Mandelbaum, Manalapan, both of N.J.

[73] Assignee: AT&T Corp, New York, N.Y.

[21] Appl. No.: 08/932,749

[22] Filed: Sep. 17, 1997

[51] Int. Cl.[7] .................................................. G06F 17/60
[52] U.S. Cl. ................... 705/7; 705/1; 705/38; 455/26.1; 455/410; 379/93.02
[58] Field of Search .................. 705/7, 1, 38; 379/93.02; 455/26.1, 410

[56] References Cited

U.S. PATENT DOCUMENTS

| | | | |
|---|---|---|---|
| 5,345,595 | 9/1994 | Johnson et al. | 455/410 |
| 5,375,244 | 12/1994 | McNair | 710/200 |
| 5,463,681 | 10/1995 | Vaios et al. | 379/189 |
| 5,465,387 | 11/1995 | Mukherjee | 455/26.1 |
| 5,495,521 | 2/1996 | Rangachar | 379/93.04 |
| 5,615,408 | 3/1997 | Johnson et al. | 455/405 |
| 5,774,882 | 6/1998 | Keen et al. | 705/38 |
| 5,790,645 | 8/1998 | Fawcett et al. | 379/189 |
| 5,819,226 | 10/1998 | Gopinathan et al. | 705/1 |
| 5,875,236 | 2/1999 | Jankowitz et al. | 379/114 |
| 5,884,289 | 3/1999 | Anderson et al. | 705/44 |

OTHER PUBLICATIONS

"Telephone Fraud: HP's New System to Help Bell Atlantic Combat Telephone Fraud", Edge, On & About AT&T, vol. 11, No. 415, Jul. 1, 1996.

Sibley, Kathleen, "Telecom Fraud a Rampant $300M Problem", Computing Canada, vol. 23, No. 12, Jun. 9, 1997.

"Consumer Fraud: AT&T Helps Consumer Group Catch Scam Artists", Edge, On & About AT&T, vol. 10, No. 19, Feb. 27, 1995.

*Primary Examiner*—Emanuel Todd Voeltz
*Assistant Examiner*—George D. Morgan
*Attorney, Agent, or Firm*—Robert B. Levy

[57] ABSTRACT

The risk of fraud associated with access by a subscriber to a network (42) is managed by a system that includes a data base (46) that stores a record for each subscriber indicative of that subscriber's usage history and payment ability for each service to which that subscriber has access. Additionally, the subscriber's record also stores an individual service risk characteristic indicative of the risk of providing access by the subscriber to a particular service, as well as a composite risk characteristic indicative of an overall risk of access. In response to a request for access to a particular service by a subscriber, the data base (46) responds in accordance with the subscriber's individual service risk characteristic for the service sought as well as the composite risk characteristic. In this way, account is taken of the subscriber's usage and payment ability with respect to all services available to the subscriber, rather than the single service sought by the subscriber.

18 Claims, 2 Drawing Sheets

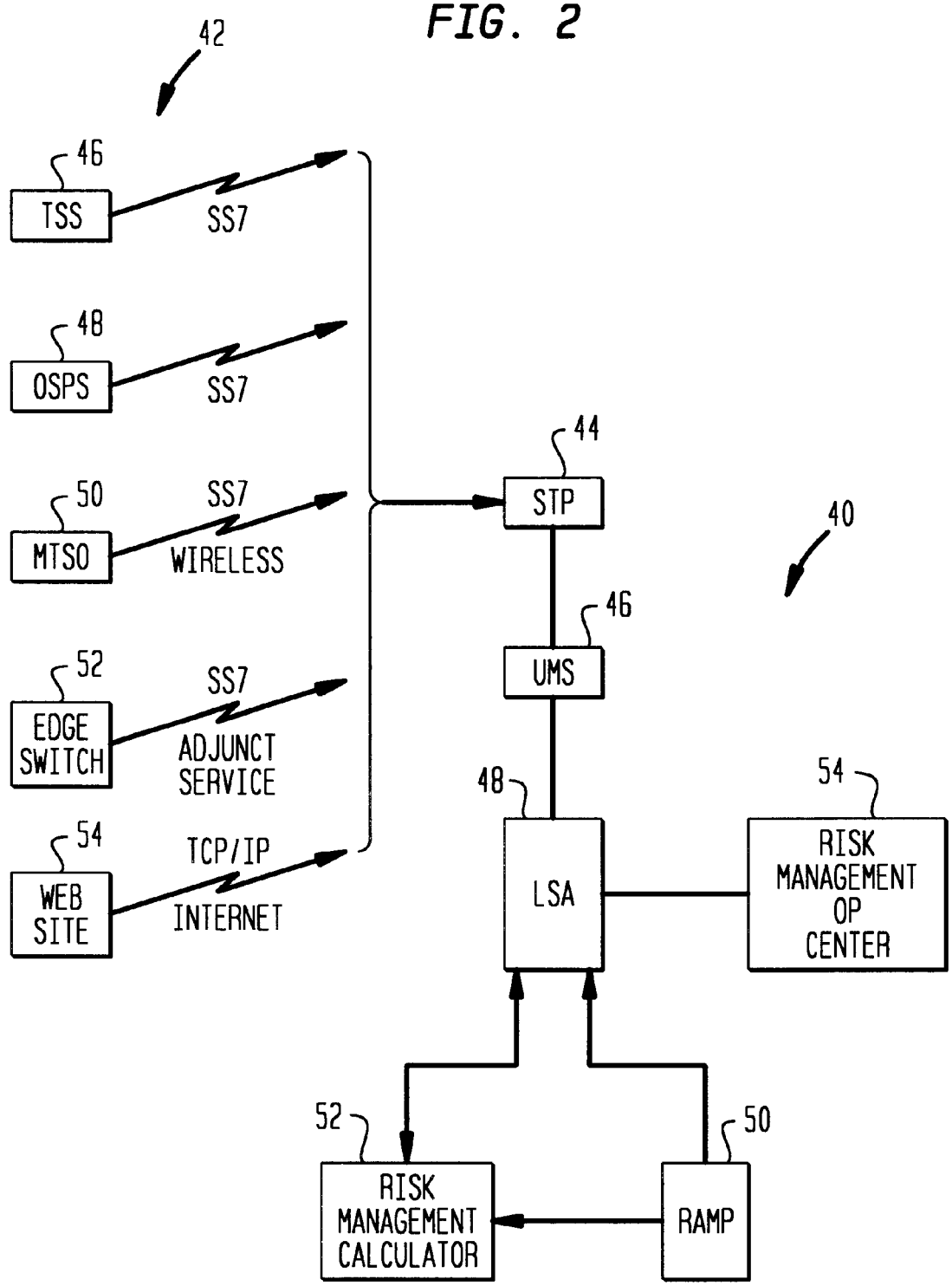

RISK MANAGEMENT TECHNIQUE FOR NETWORK ACCESS

TECHNICAL FIELD

This invention relates to a method and apparatus for controlling the access of a subscriber to a telecommunications network to reduce the incidence of fraud and non-payment.

BACKGROUND ART

Virtually all major providers of telecommunications services suffer losses as a result of fraud and non-payment. For purposes of discussion, a subscriber commits fraud by obtaining telecommunications services with no intention of ever paying for such services. For example, a subscriber commits fraud by charging the cost of telecommunications services to a stolen credit card or to a third party's number without that party's permission. Non-payment occurs when a subscriber fails to pay the incurred charges even though the subscriber intended to pay the charges when the service was rendered. For example, a subscriber with a previously good payment history may become unemployed and may no longer have the resources to pay for the services previous rendered to that subscriber.

Various techniques have been proposed to combat fraud and non-payment. U.S. Pat. No. 5,465,387, issued in the name of Arabina Mukherjee, on Nov. 7, 1995, and assigned to AT&T, discloses a technique for monitoring access to a telecommunications service. In accordance with the teachings of the '387 patent, the telecommunications network arbitrarily interrupts a subscriber's access. Upon each interrupt, the network demands an authentication code from the subscriber. If the subscriber does not enter the requisite code, the network denies further access. This technique is effective only for the particular service accessed by the subscriber. Thus, a subscriber with a non-payment history or a history of fraud in connection with another service provided by the same carrier may still obtain service by entering the requisite identification code. U.S. Pat. No. 5,495,521, issued on Feb. 27, 1996, in the name of H. Rangachar, and assigned to AT&T, discloses another technique for preventing fraudulent use of a telecommunications network. In accordance with the teachings of the '521 patent, a first data base stores, attributes associated an ongoing call made by a subscriber, such as the originating and terminating numbers. A second data base stores historical fraud data, such as the originating and terminating numbers associated with past fraudulent events. A rules data base stores rules for determining the action required for a given call. For each call, the network determines whether the attributes associated with the present call matches the data in at least one of the two data bases and if so, then the rules data base determines the requisite action. While the '521 patent is effective for certain types of fraud, the patent provides no mechanism for accounting for a subscriber's past activity related to other types of services obtained from the same carrier.

Thus, there is a need for a technique that detects fraud and non-payment in connection with multiple carrier services.

BRIEF SUMMARY OF THE INVENTION

Briefly, the invention provides a technique for managing the risk (e.g., fraud and non-payment) associated with access to a carrier's telecommunications network by a subscriber who may obtain multiple services from that carrier. To manage such risk, the carrier maintains and updates the payment ability and usage pattern for the subscriber for each service provided to the subscriber. Thus, for example, if a carrier provides a subscriber with long distance, local, and wireless service, the carrier stores and updates the subscriber's usage pattern and payment ability for each service. Additionally, for each service provided to the subscriber, the carrier computes a risk characteristic based on the subscriber's payment ability and usage pattern for that service. From the risk characteristics for the individual services, the carrier computes a composite risk characteristic.

Upon initial access by the subscriber to the carrier's network to obtain a desired service (e.g., domestic long distance), the carrier retrieves the risk characteristic of that subscriber for the desired service, as well as the subscriber's composite risk characteristic. The carrier then provides a particular call treatment based on the individual and composite risk characteristics. For example, the subscriber may have a risk characteristic representing a low risk for the desired service but a composite risk characteristic representing a high risk based on non-payment for other services obtained from the carrier. Based on the high risk represented by the composite risk characteristic, the carrier may choose to deny service, or alternatively, route the call to a fraud detection service. Conversely, if both the composite risk characteristic and the risk characteristic for the desired service represent a low risk, the carrier typically provides the service, while updating the subscriber's usage pattern in accordance with the service being provided.

BRIEF DESCRIPTION OF THE DRAWINGS

FIG. 2 is a block schematic diagram of a telecommunications network for practicing the risk management technique of the invention.

DETAILED DESCRIPTION

Figure 1:
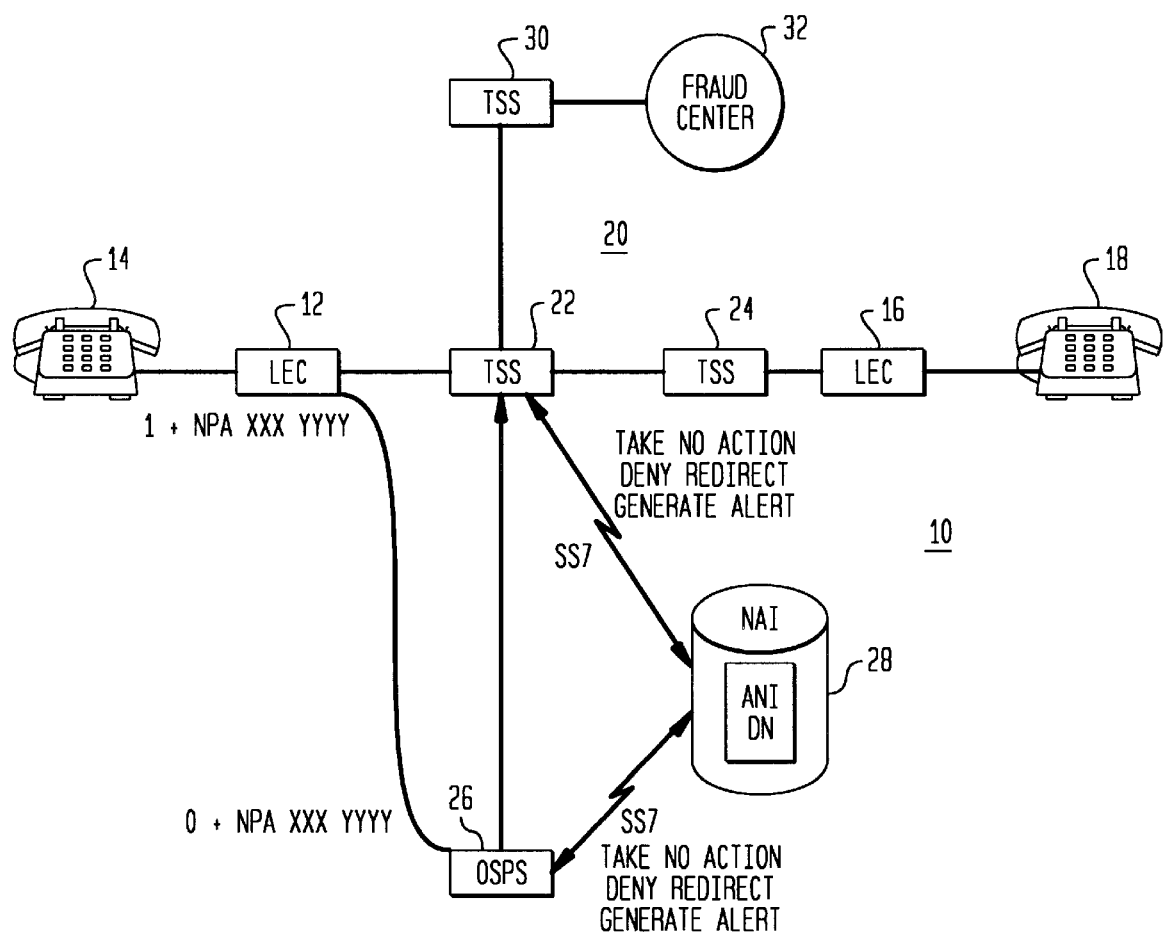
FIG. 1 is a block schematic diagram of a telecommunications network according to the prior art illustrating the present day risk management technique.

FIG. 1 illustrates a prior-art telecommunications network 10 that includes an originating and terminating local telecommunications switches 12 and 14, respectively, for providing local service (i.e., dial tone) to originating and terminating subscribers, represented by station sets 16 and 18, respectively. In practice, each of the local telecommunications switching systems 12 and 14 comprises a No. 5 ESS switching system available from Lucent Technologies, Inc.

In the illustrative embodiment, the originating and terminating subscribers 16 and 18, respectively, reside in separate Local Telephone Transport Areas (LATAs). Accordingly, an Inter-Exchange Carrier (IXC) network 20, such as the IXC network maintained by AT&T, typically carries calls between such subscribers. (The IXC could also provide local service via the switching systems 12 and 14, or by other means.) The IXC network 20 comprises an originating Toll Switching System (TSS) 22, typically a 4ESS Switching System manufactured by Lucent Technologies, Inc. The TSS 22 serves the LEC originating switching system 12, and functions to route a call an originating call received at the LEC switching system 12 to a terminating TSS 24 serving the LEC switching system 14 for receipt by the terminating subscriber 18. As shown in FIG. 1, the originating TSS 22 routes the call directly to the terminating TSS 24. However, in practice, the originating TSS 22 may route the call to the terminating TSS 24 through one or more via TSSs (not shown).

As thus described, the IXC network 20 functions to route a direct-dialed call from the originating LEC switching system 12, via the originating TSS 22 and the terminating TSS 24, to the terminating LEC switching system 14. A domestic direct-dialed call made between the subscribers 12 and 14 is referred to as "1+" call because such a call comprises a digit string of "1"+NPA-XXX-YYYY where NPA represents the area code, XXX represents the exchange and YYYY represents the line number of the terminating subscriber 18.

To facilitate collect, billed third-party, as well as operator-assisted calls, the network 20 also includes at least one Operator Service Position System (OSPS) 26 typically comprised of a No. 5 ESS switching system. The originating subscriber 16 initiates a collect, billed third party, or operator-assisted call by dialing the digit string "0" plus NPA-XXX-YYYY of the terminating subscriber 18. Upon receipt of a "0+" call, the originating LEC switching system 12 routes the call to the OSPS 26 for processing. After processing, the OSPS 26 routes the call to the originating TSS 22 for routing to the terminating LEC switching system 14 through the terminating TSS 24.

Presently, the network 20 manages the risk of fraud and non-payment associated with access of a subscriber (e.g., subscriber 14) using a Network Access Interrupt (NAI) data base 28, typically comprised of a 2NCP data base known in the telephony art. The NAI data base 28 stores subscriber-related call information, such as the subscriber's originating number (as obtained via ANI) as well as the terminating (dialed) number. The NAI data base also stores fraudulent event information, such as the originating and terminating numbers associated with past fraudulent and non-payment events, as well as call treatment information for a given class of service, such as "0+" or "1+" calls. Upon receipt of a "1+" call, the originating TSS 22 queries the NAI data base 28, via a common channel signaling link, such as AT&T's SS7 signaling system, to retrieve the data base entry for the subscriber for the desired service as well as the fraudulent and non-payment event information.

Depending on whether the subscriber's call related information matches the fraudulent and non-payment event information, the NAI data base 28 will return one of three possible responses:

1. Take No Action
2. Deny Service
3. Re-Direct the Call lo a Fraud Center 32 via a TSS 30
4. Generate an Alert for Receipt by a work center (not shown)

If the subscriber's record for the particular class of service indicates no reason why service should be denied, the NAI data base 28 signals the originating TSS 22 to take no action. In other words, the TSS 22 processes the call in the normal fashion. On the other hand, if the record in the NAI data base 28 indicates that the subscriber has a history of non-payment, the NAI data base 28 signals the TSS 22 to deny service. Upon receipt of a deny service response, the TSS 22 terminates the call. Yet another possibility is that the subscriber's call-related information may indicate that either or both the originating and terminating numbers correspond to numbers having a history of fraud. Under such circumstances, the NAI data base 28 will instruct the TSS 22 to re-direct the call to the fraud center 32 via the TSS 30 for further processing. Alternatively, the NAI data base 28 may generate an alert for receipt by a work center (not shown).

While the risk management technique of the prior art is effective, the technique suffers from the drawback that the NAI 28 only stores the subscriber's call-related information for the service presently being sought. In the illustrated embodiment, the NAI data base 28 retrieves only the subscriber's call-related information for "1+" service in response to an inquiry from the TSS 22 for a subscriber originating a "1+" (direct-dialed) call. Similarly, in response to an inquiry from the OSPS 26, the NAI data base 28 retrieves only the subscriber's call-related information for the "0+" service. A subscriber having a history of fraud and/or non-payment related to one type of service could still be afforded another type of service in accordance with the risk management technique practiced by the network of FIG. 1.

FIG. 2 depicts a system 40, in accordance with the invention, for managing the risk of fraud and non-payment associated with subscriber access to a telecommunications network 42. The system 40 includes a Signal Transfer Point (STP) 44 responsive to inquiries from the network 42 regarding subscriber access. In particular, the STP 44 responds inquiries, received via a signaling link (e.g., an SS7 link) from a TSS 46 for a "1+" call (including domestic as well as direct-dialed international long distance calls). Additionally, the STP 44 responds to inquiries, received via an SS7 signaling link, from an OSPS 48 for "0+" calls (including collect, operator-assisted, as well as third-party billed calls). Likewise, the STP 44 is also responsive to access inquiries, received via an SS7 signaling link, from wireless subscribers through a Mobile Telephone Switching Office (MTSO) 50. Further, the STP 44 can also respond to inquiries received via an SS7 signaling link from an edge switch 52 (i.e., a computer) in response to a subscriber request for access to an adjunct service, such as satellite television, for example. Moreover, the STP 44 is also responsive to inquires from computer network, such as an internet web site, received via a TCP/IP signaling link. (Although not shown, the STP 44 could also respond to access inquiries from a telecommunications switch providing local service.) In short, the STP 44 is capable of responding to inquiries for access associated with virtually any type of network access.

The STP 44 communicates the inquires received from the network 42 to a Usage Management Service (UMS) data base which stores subscriber records containing information related the subscriber's usage, payment and risk characteristic for each service afforded by the through the network 42 by the carrier, as well a composite risk characteristic for all services. An example of a typical subscriber record is illustrated in

TABLE I

| Subscriber/Composite Risk Characteristic | Service | Average Usage | Payment Ability | Service Risk Characteristic |
|---|---|---|---|---|
| 215-947-5555/$r_c$ | 1+ | 200 min/month | $300/month | $r_{s1}$ |
| | 0+ | 30 min/month | $100/month | $r_{s2}$ |

TABLE I-continued

| Subscriber/Composite Risk Characteristic | Service | Average Usage | Payment Ability | Service Risk Characteristic |
|---|---|---|---|---|
|  | Wireless | 50 min/month | $100/month | $r_{s3}$ |
|  | Local | 50 min/month | $100/month | $r_{s5}$ |
| 908-903-5555/$r_c$ | 1+ | 100 min/month | $100/month | $r_{s1}$ |
|  | Satellite TV | 1000 min/month | $40/month | $r_{s4}$ |

As may be appreciated, each subscriber's record contains that subscriber's usage, payment ability and individual service risk characteristic $r_{si}$ for each individual service i provided through the network 42 by the carrier the. (In contrast, the NAI data base 28 of FIG. 1 maintains only a single service record for each subscriber.) Moreover, each subscriber record stored by the UMS 28 also contains a composite risk characteristic $r_c$ for each subscriber, representing that subscriber's composite risk. Note that it may be desirable to provide separate records for domestic and international direct-dialed long distance ("1+") service and separate records in connection with different types of "0+" calls.

The records stored in the UMS data base 46 are created by a Line System Administrator (LSA) 48, typically, a computer, coupled to a Risk Access Management Provisioning (RAMP) system. 50, typically a data base that receives subscriber provisioning information. In other words, the RAMP system 50 provides information to the LSA 48 about each network subscriber and the services received by that subscriber. As a subscriber accesses the network 40, the LSA 48 records information about the subscribers usage for each particular service, and sends such information to the UMS data base 46 to update the record for that subscriber. Similarly, the LSA 48 also receives subscriber billing information via the RAMP system 50 and updates the records in the UMS data base 46 accordingly.

The LSA 48 is coupled to a Risk Management Calculator 52 that calculates the individual service risk characteristic ($r_{si}$) for service subscribed to by a subscriber, as well as the composite risk characteristic ($r_c$). (Although the Risk Management Calculator 52 is illustrated in FIG. 2 as a separate element, its function could be incorporated within the LSA 48.)

As alluded to earlier, the individual service risk characteristic ($r_{si}$) is a number that quantifies the risk associated with providing access to the subscriber for the corresponding service. The individual service risk characteristic for a given service i ($r_{si}$) is given as a function of the subscriber's service usage and payment ability for the corresponding service as indicated in Eq. 1

$$r_{si} = f(\text{usage of service i, payment ability of service i})$$

For example, the Risk Management Calculator 52 may compute the individual service risk characteristic $r_{si}$ for an individual service i in accordance with the ratio of the subscriber's service usage (or some quantity varying directly therewith) to the subscriber's payment ability (or some quantity varying directly therewith). Thus, as the subscriber's service usage increases with no corresponding increase in the payment ability, the individual service risk characteristic becomes larger, representing a higher risk. Conversely, if the subscriber's payment ability increases with no corresponding increase in the service usage, then the individual service risk characteristic computed in the manner described decreases, representing a smaller risk.

As discussed, a subscriber's individual risk characteristic for a given service, as well that subscriber's composite risk characteristic, is based on the subscriber's service usage and payment ability. For new subscribers with no past payment ability data or service usage data, individual service risk characteristics and composite risk characteristic may be established based either on demographics and/or from a credit report for that subscriber.

As its name implies, the composite risk characteristic ($r_c$) for a subscriber represents the composite or combination of that subscriber's individual service risk characteristics ($r_{s1}$, $r_{s2}$ ... $r_{sx}$) where s1, s2 ... sx represent the individual services subscribed to by that subscriber. For example, the Risk Management Calculator 52 may compute the composite risk characteristic from the average of the individual service risk characteristics. In this way, even though a subscriber could have a low risk characteristic for a particular service for which access is sought, the subscriber's other individual service risk characteristics may be high, causing the composite service risk characteristic (obtained from the average of the individual characteristics) to be high.

The risk characteristics computed by the Risk Management Calculator 52 are provided to the LSA 48, which, in turn, combines the individual service risk characteristics and the composite risk characteristic with the subscriber's service usage and payment ability information to provide the data base records to the UMS data base 46. In this way, the records stored in the UMS data base 46 are updated both with respect to each subscriber's service usage and payment ability, as well as that subscriber's individual service risk characteristics and the composite risk characteristic. Thus, should a subscriber's usage suddenly change, possibly because of fraud that may not be attributable to that subscriber, then the LSA 48 will provide the UMS data base 46 with timely information, possibly allowing the perpetrators of such fraud to be apprehended.

Advantageously, the system 40 may also include a Risk Management Center 54, comprised of a bank of telephone operators, each having a terminal linked either directly, or through a network (not shown) to the LSA 48. The operators at the risk management center 54 typically serve to monitor and adjust, if necessary, the subscriber records created by the LSA 48. For example, the LSA 48 may have supplied a subscriber record to the UMS data base 46 that reflected a bad payment history for a particular subscriber in accordance with data provided by the RAMP system 50. However, the subscriber having the bad payment history may have made a payment arrangement, which may require manual intervention by an operator at the risk management center. Moreover, should the LSA 48 detect possible fraud based on excessive service usage, the LSA 48 may alert an operator at the Risk Management Operations Center 54 to take appropriate action.

The foregoing describes a method and apparatus for managing the risk of subscriber access to a network 42 in accordance with an individual service risk characteristic based on the subscriber's usage and payment ability for an individual service, as well as a composite risk characteristic based the subscriber's usage and payment ability and usage of all services.

The system 40 operates to manage a risk of access by a subscriber to the network 42 in the following manner. Upon receipt of an access inquiry from a particular subscriber received from the network 42 at the STP 44, the UMS data base 46 accesses that subscriber's record. Based on the subscriber's individual service risk characteristic for the service to be accessed and the subscriber's composite risk characteristic, the UMS data base 46 will return one of three possible responses:

1. Take No Action
2. Deny Service
3. Re-Direct the Request
4. Generate an Alert for Receipt by a work center (not shown)

If the subscriber's individual service risk characteristic indicates a low risk of access for the particular service sought by the subscriber, and the composite risk characteristic is also low, the UMS data base 46 provides a response to the network 42 through the STP 44 to take no action. In other words, the subscriber's request for access is processed in the normal fashion. On the other hand, if the record in the UMS data base 46 indicates, either by way of a high individual service risk characteristic or a high composite risk characteristic, that the subscriber represents a bad risk of access, the UMS data base 46 responds by indicating that service should be denied. Yet another possibility is that the subscriber's service record may indicate a possibility of fraudulent access. Under such circumstances, the UMS data base 46 will respond by recommending that the subscriber's access request should be re-directed, possibly to the to the Risk Management Center 54, for further processing. Alternatively, the UMS data base 46 may generate an alert for receipt by a work center (not shown).

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for managing the risk of access by a subscriber to a network for a particular one of a plurality of separate and distinct services subscribed to by said subscriber, comprising the steps of:

maintaining a record for each said subscriber that includes usage and payment ability information for each of said separate and distinct services subscribed to by said each subscriber and an individual risk characteristic representing the risk associated with access by that subscriber for said each separate and distinct service and a composite risk characteristic, representing the composite risk associated with access to all of said each services by said each subscriber;

retrieving, upon receipt of a request by said each subscriber for access said each service, the record corresponding to said each subscriber; and determining, from said each subscriber's individual service risk characteristic for said each service to be accessed by said each subscriber and said each subscriber's risk composite characteristic, whether said each subscriber should gain access to said each service.

2. The method according to claim 1 wherein the subscriber is permitted access to said service if both the subscriber's individual service risk characteristic for said service represents a low risk and the subscriber's composite risk characteristic also represents a low risk.

3. The method according to claim 1 wherein the subscriber is denied access to said service if one of the subscriber's individual service risk characteristic for said service represents a high risk, and the subscriber's composite risk characteristic represents a high risk.

4. The method according to claim 1 wherein the subscriber's request for access is re-directed for further processing if one of the subscriber's individual service risk characteristic for said service represents a high risk and the subscriber's composite risk characteristic represents a high risk.

5. The method according to claim 1 wherein the subscriber's individual service risk characteristic for said service is established in accordance with the subscriber's service usage history and payment ability information for that service.

6. The method according to claim 5 where subscriber's individual service risk characteristic for said particular service is established in accordance with the ratio of the subscriber's service usage to the subscriber's payment ability.

7. The method according to claim 1 wherein the subscriber's composite risk characteristic is established from all of the subscriber's individual service risk characteristics.

8. The method according to claim 1 wherein the subscriber's composite risk characteristic is established from the average of the subscriber's individual service risk characteristics.

9. The method according to claim 1 wherein the plurality of services available to the subscriber includes direct-dial long distance service.

10. The method according to claim 1 wherein the plurality of services available to the subscriber includes "0+" long distance service.

11. The method according to claim 1 wherein the plurality of services available to the subscriber includes wireless telecommunication service.

12. The method according to claim 1 wherein the plurality of services available to the subscriber includes an adjunct service.

13. The method according to claim 12 wherein the adjunct service comprises satellite television.

14. The method according to claim 1 wherein the plurality of services available to the subscriber includes internet access.

15. The method according to claim 1 wherein the plurality of services available to the subscriber includes local service.

16. A system for managing the risk of access by a subscriber to a network for a particular one of a plurality of separate and distinct services subscribed to by said subscriber, comprising:

a signal transfer point for accepting inquiries and for providing responses regarding subscriber requests for access to one of said plurality of separate and distinct services;

a data base for maintaining at least one record for each subscriber that includes usage and payment ability information for each of said separate and distinct services subscribed to by said each subscriber and an individual risk characteristic representing the risk associated with access by said each subscriber for said each service and a composite risk characteristic, representing the composite risk associated with access by said each subscriber for all of said separate and distinct services; said data base responsive to an access inquiry received from the signal transfer point and providing a response thereto in accordance with said each subscriber's individual risk characteristic for said each service to be accessed and said each subscriber's composite risk characteristic and means for establishing said records maintained by said data base.

17. The system according to claim 16 wherein said means for establishing said records comprises:

a Risk Access Management Provisioning System for obtaining provisioning, usage data and payment ability for said each subscriber for said each separate and distinct service;

a Risk Management Calculator for establishing said individual service risk characteristic for said each separate and distinct service based of said each subscriber's usage history and payment ability for said each service and for establishing said composite risk characteristic in accordance with all of said individual service risk characteristics; and a Line Service Administration system for creating each said record in accordance with the usage data and payment history obtained from said Risk Access Management Provisioning System and said individual service risk characteristics and said composite risk characteristic from said Risk Management Calculator.

18. The system according to claim 17 further including a Risk Management Operations center coupled to the Line Service Administration System for enabling an operator to monitor, and adjust, as necessary, said records.

* * * * *